No. 762,440. PATENTED JUNE 14, 1904.
H. S. ROBINSON.
STEAM COOKER.
APPLICATION FILED JULY 3, 1903.
NO MODEL.
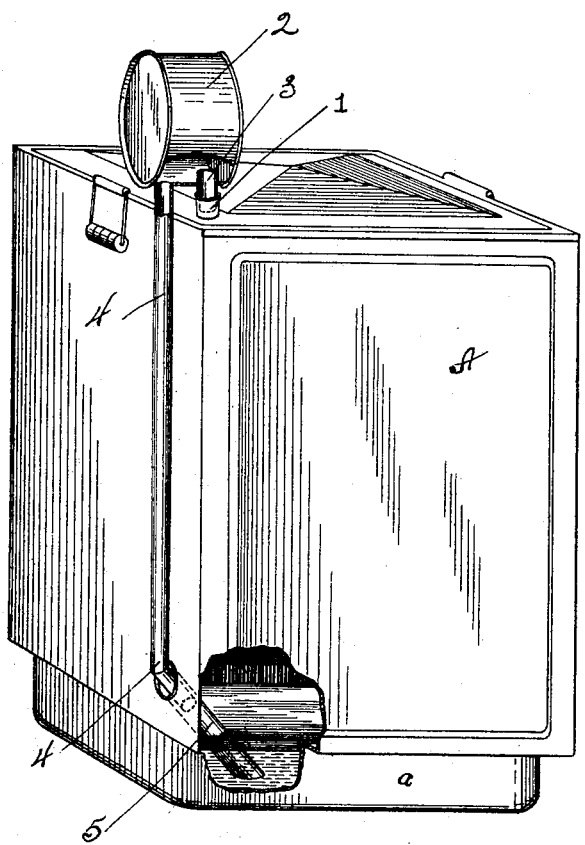
WITNESSES:
David C. Walter
Myer Geleerd.
INVENTOR.
Harry S. Robinson,
By Owen & Owen
His attorneys.

No. 762,440. Patented June 14, 1904.

UNITED STATES PATENT OFFICE.

HARRY S. ROBINSON, OF TOLEDO, OHIO.

STEAM-COOKER.

SPECIFICATION forming part of Letters Patent No. 762,440, dated June 14, 1904.

Application filed July 3, 1903. Serial No. 164,120. (No model.)

*To all whom it may concern:*

Be it known that I, HARRY S. ROBINSON, a citizen of the United States, and a resident of Toledo, in the county of Lucas and State of Ohio, have invented certain new and useful Improvements in Steam-Cookers; and I do hereby declare the following to be a full, clear, and exact description of the invention, such as will enable others skilled in the art to which it belongs to make and use the same, reference being had to the accompanying drawing, and to the letters and figures of reference marked thereon, which forms a part of this specification.

My invention relates to improvements in steam-cookers; and has for its object to provide improved means for cooling and condensing the steam generated therein and causing the condensation-water to return to the tank in the bottom of the cooker and also to provide an improved form of gage for determining the depth of water in said cooker.

The invention is fully disclosed in the following specification, of which the accompanying drawing, showing a rear perspective view of a square form of cooker and having portions broken away to better illustrate the features thereof, forms a part.

In the drawing, A represents an ordinary type of square cooker, the bottom of which is adapted to hold a desired quantity of water to be heated for the purpose of generating steam therein. It will be understood that the cooker A may be of any desired shape and either provided with doors or a removable cover.

On the top of the cooker A, adjacent to the edge thereof, is formed a nozzle or projection 1, opening into the said cooker and affording a free communication between the interior thereof and the condenser 2, which is removably supported above said nozzle. The condenser 2 is provided with the short nipple 3, adapted to be inserted within the nozzle 1 and also to extend a suitable distance within the condenser 2 to form an annular flange or shoulder therein for preventing the condensation-water from returning therethrough to the cooker. Said condenser 2 is also provided with the outlet or drainage tube 4, which passes down the side of the cooker A and communicates with the water-pan $a$ thereof through the enlarged tube 5, within which its lower end is adapted to be loosely inserted, as shown.

The enlarged tube 5 has one end secured within an aperture provided in the side of the cooker A adjacent to its bottom and has its other end extended obliquely therein to within a short distance of the bottom of the water-pan $a$, thus adapting it when the tube 4 is removed therefrom to act as a gage for determining the depth of water in the cooker and as a means of refilling the water-pan when it boils dry or the water therein becomes low.

It will be apparent that my cooker may be tipped up and emptied of water through the nozzle 1 or refilled through either nozzle 1 or the gage 5, the condenser 2, with its connected tubes, being first removed for those purposes.

It is obvious that such changes in the form, proportion, and minor details of construction of the parts as fairly fall within the scope of my invention may be made without departing from the spirit or sacrificing any of the advantages thereof.

Having thus described my invention, what I claim as new, and desire to secure by Letters Patent, is—

1. In a steam-cooker, a nozzle projecting from its upper portion, an obliquely-disposed tube in its lower portion, a condenser having a nipple adapted to engage said nozzle and to support said condenser above said cooker, and a drainage-tube leading to said obliquely-disposed tube, substantially as described.

2. In a cooker, a steam-escape opening leading from its upper portion, an obliquely-disposed tube in its lower portion, a condenser removably supported entirely without said cooker and communicating with said escape-opening, and a drainage-pipe leading from said condenser to and having its end loosely inserted in said obliquely-disposed tube, substantially as described.

3. The combination with a cooker having a steam-escape opening in its upper portion, and an opening in its lower portion, of a condenser provided with a nipple adapted to communicate with and to support said condenser above said escape-opening and a drainage-pipe leading to and having its free end inserted within said lower opening, substantially as described.

4. The combination with a cooker having a steam-escape opening in its upper portion, and a tube obliquely disposed within its lower portion, said tube having its lower end terminating adjacent to the bottom of said cooker and its upper end secured within an opening provided above the water-line thereof, of a condenser removably supported above said escape-opening entirely without said cooker and having communication therewith and provided with a drainage-pipe having its lower end in removable engagement with said tube, substantially as described.

5. In combination, a steam-cooker having a closed top, a nozzle secured to said top adjacent to the edge thereof and communicating with the interior of said cooker, an obliquely-disposed tube extending within said cooker and having its lower end terminating adjacent to the bottom thereof and its upper end secured within an aperture provided in the side of said cooker above the high-water line thereof, a condenser mounted above and separated from the top of said cooker by said nozzle, a nipple projecting from said condenser and adapted to afford communication between and to support said condenser above said cooker, and an outlet-tube leading from said condenser to and having its end loosely inserted in said obliquely-disposed tube, substantially as described.

In testimony whereof I have signed my name to this specification in the presence of two subscribing witnesses.

HARRY S. ROBINSON.

Witnesses:
EMIL J. VOGELSANG,
C. W. OWEN.